US011360882B2

(12) United States Patent
Padubidri et al.

(10) Patent No.: US 11,360,882 B2
(45) Date of Patent: Jun. 14, 2022

(54) METHOD AND APPARATUS FOR CALCULATING A SOFTWARE STABILITY INDEX

(71) Applicant: Dell Products L.P., Round Rock, TX (US)

(72) Inventors: Subramanya Padubidri, Bangalore (IN); Vinay Kumar M, Mysore (IN); Chethan Kumar B C, Shimoga (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/931,035

(22) Filed: May 13, 2020

(65) Prior Publication Data
US 2021/0357315 A1 Nov. 18, 2021

(51) Int. Cl.
*G06F 11/36* (2006.01)
*G06F 8/60* (2018.01)

(52) U.S. Cl.
CPC ........... *G06F 11/3692* (2013.01); *G06F 8/60* (2013.01); *G06F 11/3664* (2013.01); *G06F 11/3688* (2013.01)

(58) Field of Classification Search
None
See application file for complete search history.

(56) References Cited

U.S. PATENT DOCUMENTS

| | | | | |
|---|---|---|---|---|
| 9,021,441 B2* | 4/2015 | Yawalkar | ............ | G06F 11/3616 717/124 |
| 9,798,954 B1* | 10/2017 | Liu | ........ | G06V 10/44 |
| 10,732,957 B2* | 8/2020 | Dattatri | ............ | G06F 8/61 |
| 2008/0126831 A1* | 5/2008 | Downey | ................ | H04L 69/40 714/4.2 |
| 2012/0304157 A1* | 11/2012 | Kawashima | ........ | G06F 11/3672 717/131 |
| 2014/0123110 A1* | 5/2014 | Wan | ................... | G06F 11/3672 717/124 |
| 2018/0285244 A1* | 10/2018 | Subramanian Jayaraman | ............ | G06F 11/3664 |
| 2019/0340108 A1* | 11/2019 | Yabusaki | ............ | G06F 11/3692 |
| 2020/0133830 A1* | 4/2020 | Sharma | ................ | G06N 20/00 |

FOREIGN PATENT DOCUMENTS

CN        105468510 A    *  9/2014

OTHER PUBLICATIONS

Goodfirms, "What is Software Deployment?", 2020, https://www.goodfirms.co/glossary/software-deployment/ (Year: 2020).*
Peng, "Software Error Analysis", 1993, NIST Special Publication 500-209 (Year: 1993).*

* cited by examiner

*Primary Examiner* — Hossain M Morshed
(74) *Attorney, Agent, or Firm* — Daly, Crowley Mofford & Durkee, LLP

(57) ABSTRACT

A method is provided, comprising: deploying source code to a non-production instance of a software application; executing one or more tests on the non-production instance of the software application and logging any events that are generated during the tests in one or more test logs; retrieving data from the one or more test logs and calculating a stability index for the source code based on the data that is retrieved from the one or more test logs; and deploying the source code to a production-instance of the software application based on the stability index of the source code.

20 Claims, 9 Drawing Sheets

400

| EVENTS GENERATED DURING TESTING OF COMMIT #23456A | | WEIGHTS | | EVENT OCCURRENCE RATES | |
|---|---|---|---|---|---|
| 402A | HTTP 500    404 | 0.3 | 406 | 2.01 | 406 |
| 402B | HTTP 400    404 | 0.2 | 406 | 0.52 | 406 |
| 402C | EXCEPTIONS  404 | 0.3 | 406 | 0.23 | 406 |
| 402D | APPLICATION CRASH  404 | 0.2 | 406 | 0 | 406 |

| EVENTS GENERATED DURING TESTING OF COMMIT #23456A | | WEIGHTS | | EVENT OCCURRENCE RATES | |
|---|---|---|---|---|---|
| HTTP 500 | 404 | 0.3 | 406 | 2.01 | 406 |
| HTTP 400 | 404 | 0.2 | 406 | 0.52 | 406 |
| EXCEPTIONS | 404 | 0.3 | 406 | 0.23 | 406 |
| APPLICATION CRASH | 404 | 0.2 | 406 | 0 | 406 |

400

402A — HTTP 500
402B — HTTP 400
402C — EXCEPTIONS
402D — APPLICATION CRASH

*STABILITY INDEX = 1-AVERAGE_OCCURENCE_RATE*

*AVERAGE_OCCURENCE_RATE = 0.3x2.01+0.2X0.52+0.3X0.23+0.2X0.00*

METHOD AND APPARATUS FOR CALCULATING A SOFTWARE STABILITY INDEX

BACKGROUND

Developing and releasing software can be a complex process, especially as applications, teams, and deployment infrastructure grow in complexity. Oftentimes, a software component may pass all tests when it is tested individually, but it may fail when it is integrated with other software components. The failure may occur as a result of the software component being incompatible with the other software components.

SUMMARY

According to aspects of the disclosure, a method is provided, comprising: deploying source code to a non-production instance of a software application; executing one or more tests on the non-production instance of the software application and logging any events that are generated during the tests in one or more test logs; retrieving data from the one or more test logs and calculating a stability index for the source code based on the data that is retrieved from the one or more test logs; and deploying the source code to a production-instance of the software application based on the stability index of the source code.

According to aspects of the disclosure, a system is provided, comprising: a memory; and at least one processor operatively coupled to the memory, the at least one processor being configured to perform the operations of: deploying source code to a non-production instance of a software application; executing one or more tests on the non-production instance of the software application and logging any events that are generated during the tests in one or more test logs; retrieving data from the one or more test logs and calculating a stability index for the source code based on the data that is retrieved from the one or more test logs; and deploying the source code to a production-instance of the software application based on the stability index of the source code.

According to aspects of the disclosure, a non-transitory computer-readable medium storing one or more processor-executable instructions, which, when executed by at least one processor, cause the at least one processor to perform the operations of: deploying source code to a non-production instance of a software application; executing one or more tests on the non-production instance of the software application and logging any events that are generated during the tests in one or more test logs; retrieving data from the one or more test logs and calculating a stability index for the source code based on the data that is retrieved from the one or more test logs; and deploying the source code to a production-instance of the software application based on the stability index of the source code.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Figure 1:
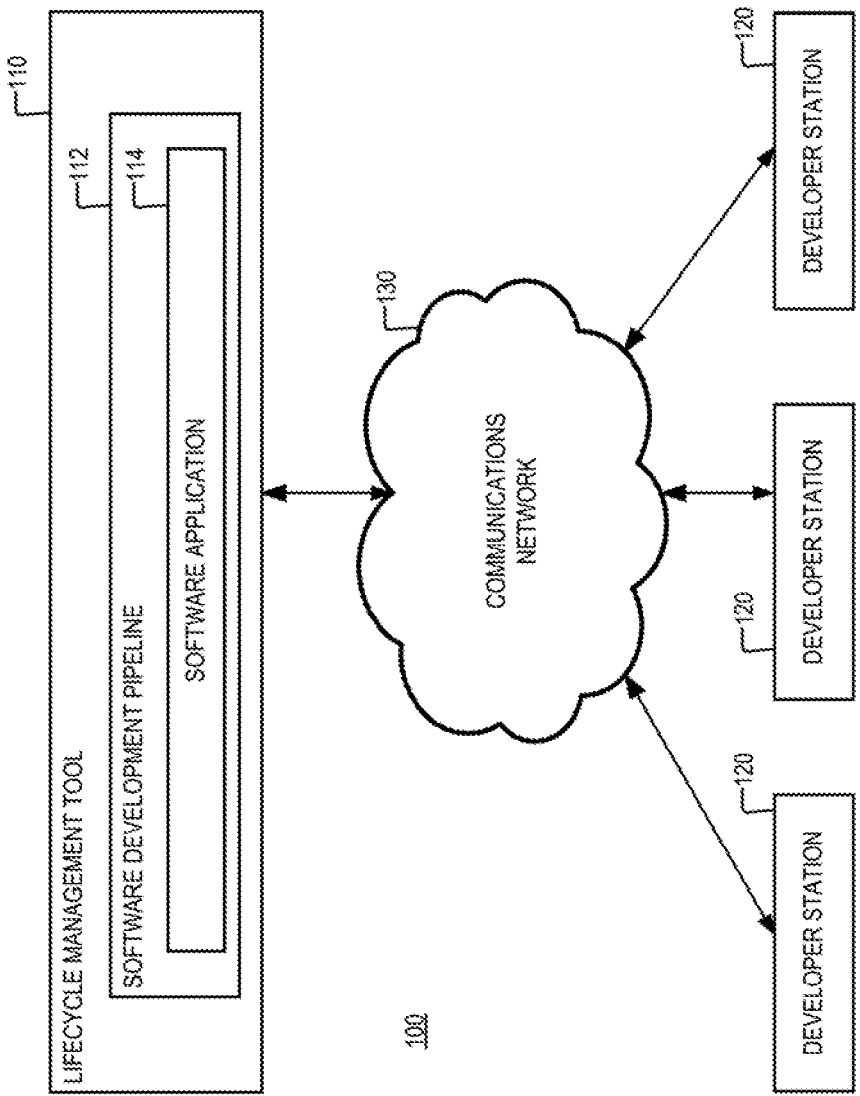
FIG. 1 is a diagram of an example of a system, according to aspects of the disclosure.

FIG. 1 is a diagram of an example of a software development system 100, according to aspects of the disclosure. As illustrated, the software development system 100 may include a lifecycle management tool 110 and a plurality of developer stations 120 that are coupled to one another via a communications network 130. Any of the plurality of developer stations 120 may include a desktop computer, a laptop computer, a tablet, and/or any other suitable type of computing device that can be used to write, test, and execute source code. The communications network 130 may include one or more of a local area network (LAN), a wide area network (WAN), the Internet, and/or any other suitable type of communications network.

The lifecycle management tool 110 may include any suitable type of system for managing, testing, and/or deploying source code. In some implementations, the lifecycle management tool 110 may include a software repository. Additionally, or alternatively, in some implementations, the lifecycle management tool 110 may include a lifecycle management tool, such as GitLab™. In some implementations, the lifecycle management tool 110 may implement a software development pipeline 112 that is used for the development of a software application 114. The pipeline 112 may include a Continuous Integration and Continuous Deployment (CICD) pipeline, and/or any other suitable type of pipeline. The pipeline 112 may be arranged to run tests on a build of source code (for the software application 114) as a series of sequential stages. At each stage, the build either fails the test or passes the test. When the build passes all tests, the source code may be released into a production instance of the software application 114.

In some implementations, the lifecycle management tool 110 may be configured to generate a stability index for source code. The stability index may include a number that indicates how likely is the source code to cause a failure in the software application 114 after the source code is built into a new version of the software application 114 and/or integrated with other components of the software application 114. The stability index may be calculated based on the respective occurrence rates of various types of events (e.g., errors, exceptions, etc.) that take place during the testing of the source code. The manner in which the stability index is calculated is discussed further below with respect to FIGS. 2-10.

Figure 2:
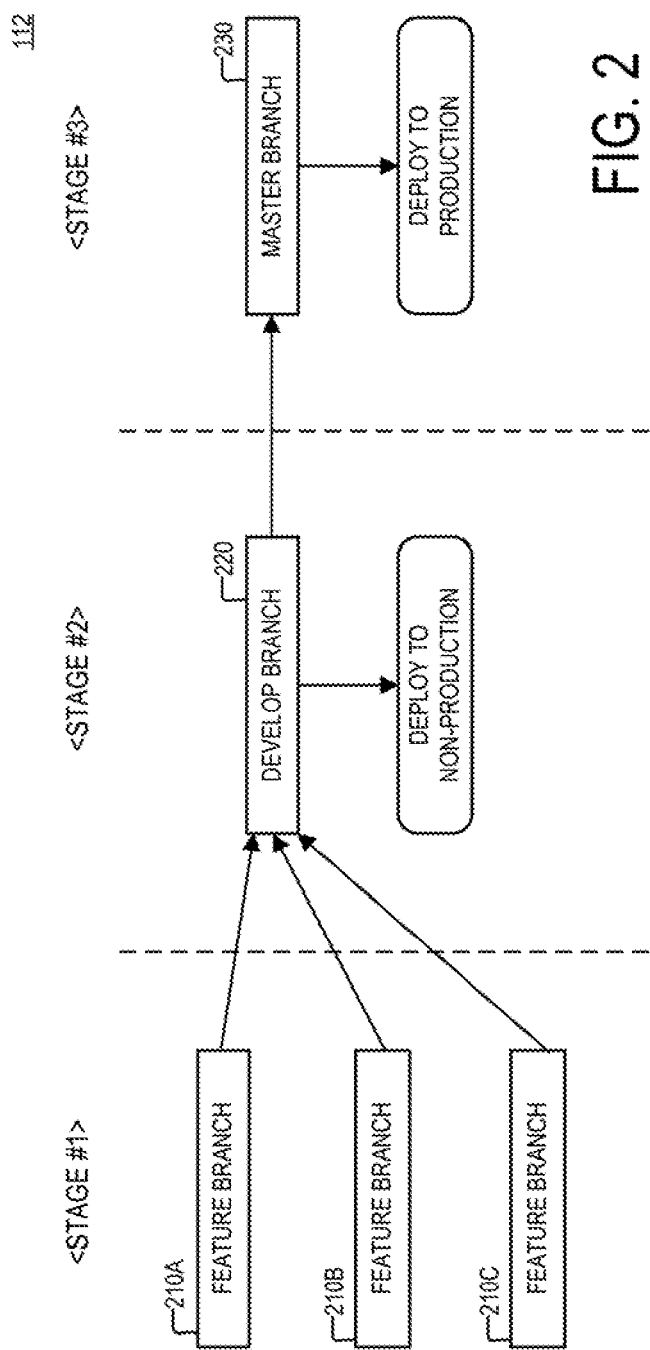
FIG. 2 is a diagram of an example of a software development pipeline, according to aspects of the disclosure.

FIG. 2 is a schematic diagram of the pipeline 112, according to one example. As illustrated, according to the present example, the pipeline 112 includes three stages, which are herein referred to as "stage #1", "stage #2", and "stage #3". At stage #1, a plurality of feature branches 210 are added to the pipeline 112. Each of the feature branches 210 may include untested source code that is produced by one or more software developers. At stage #2, the feature branches 210 are merged (e.g., linked) to produce a develop branch 220, and the develop branch 220 is deployed to a non-production instance of the software application 114. The non-production instance of the software application 114 may include a build of the software application 114 that is produced for testing purposes only, and which is not made available to outside users of the software application 114. After the develop branch 220 is deployed to the non-production instance of the software application 114, a plurality of tests may be executed against the non-production instance of the software application 114 in a well-known fashion. Such tests may include unit tests, acceptance tests, integration tests, and/or any other suitable type of test. If all of the tests are passed successfully, the develop branch 220 is promoted to a master branch 230, after which the master branch 230 is deployed to a production instance of the software application 114.

Figures 3, 4A, 4B:
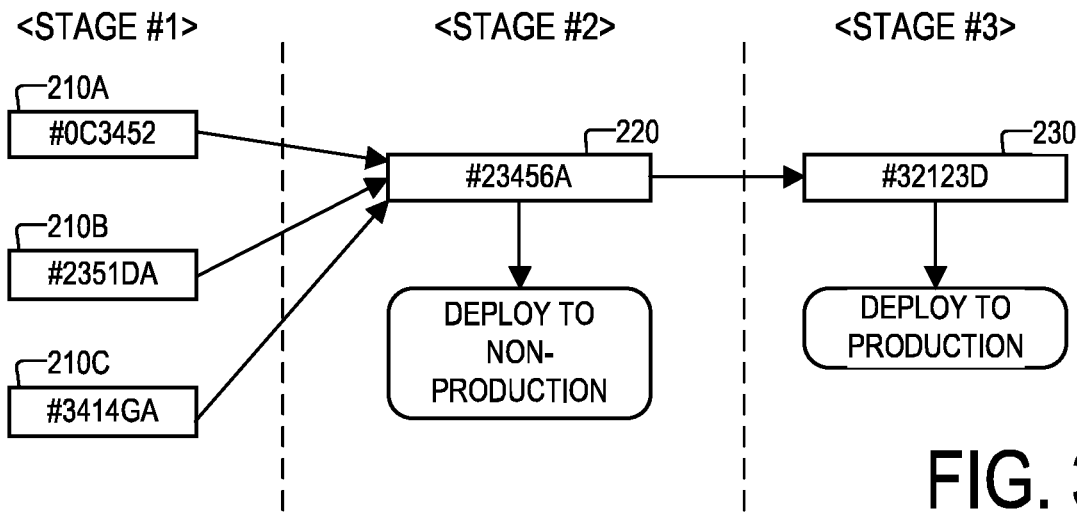
FIG. 3 is a diagram of an example of a software development pipeline, according to aspects of the disclosure.
FIG. 4A is a diagram of an example of a database, according to aspects of the disclosure.
FIG. 4B shows an example of a formula for calculating a stability index for source code, according to aspects of the disclosure.

FIG. 3 is a schematic diagram of the pipeline 112, according to aspects of the disclosure. FIG. 3 provided to illustrate that each branch in the pipeline 112 may be provided a respective commit ID that is used to track the status of the branch. As illustrated in FIG. 4B, in some implementations, the commit 1D of the develop branch 220 may be used to log the occurrence rate of various events that have occurred during testing of the develop branch 220 (at stage #2 of the pipeline 112). Shown in FIG. 4A is a database 400 that includes a plurality of entries 402. Each of the entries 402 may include a field 404 that identifies a type of event. Furthermore, each of the entries 402 may include a field 406 that identifies a weight associated with the entry's type of event, and a field 408 that identifies the occurrence rate of the entry's 402 type of event.

According to the example of FIG. 4A, entry 402A indicates that: (i) HTTP 500 errors have occurred at the rate of 2.01% during the testing of the develop branch 220, and (ii) this type of event (i.e., HTTP 500 errors) is associated with a weight of 30. Entry 402B indicates that: (i) HTTP 400 errors have occurred at the rate of 0.52% during the testing of the develop branch 220, and (ii) this type of event (i.e., HTTP 400 errors) is associated with a weight of 20. Entry 402C indicates that: (i) one or more types of exceptions have occurred at the rate of 0.23% during the testing of the develop branch 220, and (ii) this type of event (i.e., exceptions) is associated with a weight of 30. And entry 402D indicates that: (i) one or more types of crashes have occurred at the rate of 0.00% during the testing of the develop branch 220, and ii) this type of event i.e., crashes) is associated with a weight of 20. FIG. 4A is provided to illustrate an example of the data that is used to calculate a stability index for the software application 114. However, it will be understood that the data used in calculating the stability index may be stored in a format that is different than the one shown in FIG. 4A. In this regard, it will be understood that the present disclosure is not limited to any specific format for storing the data that is used in calculating the stability index.

FIG. 4B illustrates an example of a method for calculating a stability index for the develop branch 220, according to aspects of the disclosure. As illustrated in FIG. 4B, the stability index may be calculated by subtracting, from 1, the average rate of occurrence of the events that are logged in the database 400. Furthermore, as illustrated, the average rate of occurrence of the events that are logged in the database 400 is a weighted average rate that is calculated based on the weights that are identified in the database 400. More particularly, the average rate of occurrence may be calculated by: (i) weighing the occurrence rate for HTTP 500 errors by the weight for HTTP 500 errors (identified in entry 402A of the database 400); (ii) weighing the occurrence rate of HTTP 400 errors by the weight for HTTP 400 errors (identified in entry 402B of the database 400): (iii) weighing the occurrence rate of exceptions by the weight for exceptions (identified in entry 402C of the database 400); (iv) weighing the occurrence rate of crashes by the weight for crashes (identified in entry 402D of the database 400); and (v) summing up the weighted occurrence rates that are calculated at steps (i)-(iv). FIG. 4B is provided as an example only. In some implementations, the stability index may include any number that is (at least in part proportional or otherwise based on) the occurrence rates of one or more events that are detected during the testing of source code. In this regard, it will be understood that the present disclosure is not limited to any specific method for calculating the stability index.

Figure 5:
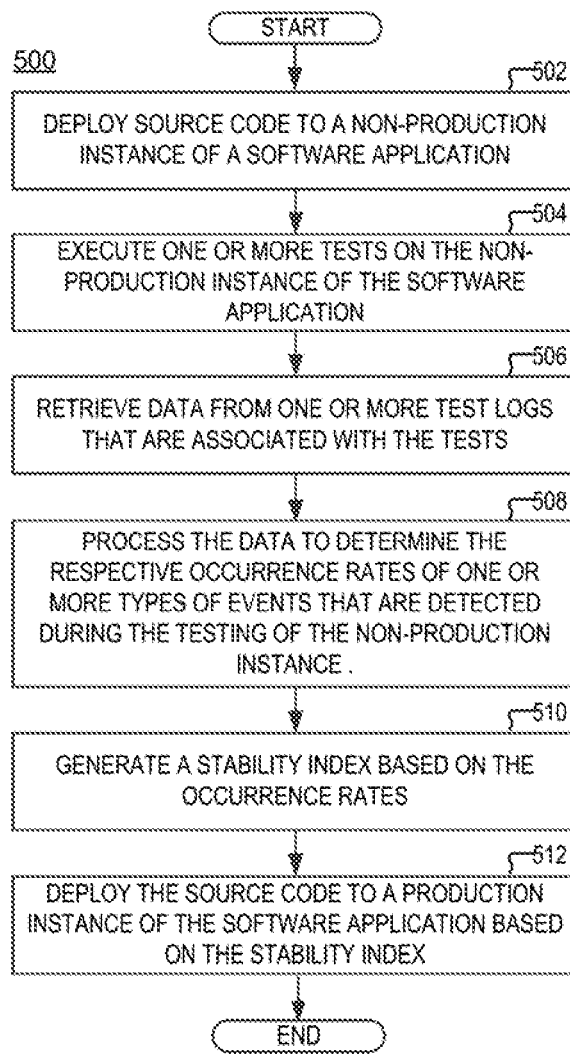
FIG. 5 is a flowchart of an example of a process for calculating a stability index for source code, according to aspects of the disclosure.

FIG. 5 is a flowchart of an example of a process 500 for calculating a stability index, according to aspects of the disclosure. According to the example of FIG. 5, the process 500 is executed by a lifecycle management tool, such as the lifecycle management tool 100, which is discussed above with respect to FIG. 1. However, it will be understood that the present disclosure is not limited to any specific implementation of the process 500.

At step 502, source code is deployed to a non-production instance of a software application. As noted above, deploying the source code to a non-production instance may include one or more of compiling the code, linking the code, and/or taking any other action that is necessary for executing the code. At step 504, one or more tests are executed on the non-production instance. The tests may include any suitable type of test that is customarily used to test source code, such as a unit test, an integration test, or an acceptance test. When the tests are executed, various events are detected and recorded in one or more test logs. The events may include an error, an exception, an application crash, and or any other suitable type of event. Recording any of the events in a test log may include storing in the test log an identifier corresponding to the event, an indication of a line of code where the event occurred, and/or any other suitable type of information that is normally logged during the testing of software. At step 506, data stored in the test logs is retrieved.

At step 508, the retrieved data is processed to identify the occurrence rate of one or more types of the events that are generated during the execution of the tests. In some implementations, processing the data may include identifying the rate at which HTTP 500 errors are generated during the execution of the tests. Additionally or alternatively, in some implementations, processing the data may include identifying the rate at which HTTP 400 errors are generated during the execution of the tests. Additionally or alternatively, in some implementations, processing the data may include identifying the rate at which one or more types of exceptions (or exceptions in general) are generated during the execution of the tests. The exceptions may include heap overflow exceptions, null pointer exceptions, and/or any other suitable type of exception. Additionally or alternatively, in some implementations, processing the data may include identifying the rate at which the non-production instance of the application has crashed during the execution of the tests.

In some implementations, the rate of occurrence of a particular type of event may be equal (or otherwise based on) the percentage of tests that result in the type of event being generated. For example, if 2.01% of tests cause an HTTP 500 error to be generated by the non-production instance of the source code, the rate of occurrence of HTTP 500 errors may be said to be 2.01%. As another example, if 0.52% of tests cause an HTTP 500 error to be generated by the non-production instance of the source code, the rate of occurrence of HTTP 500 errors may be said to be 0.52%. As another example, if 0.23% of tests cause an HTTP 500 error to be generated by the non-production instance of the source code, the rate of occurrence of HTTP 500 errors may be said to be 0.23%. However, those of ordinary skill in the art would readily recognize that there are various ways of calculating (and/or measuring) the occurrence rate of a particular type of event during testing. In this regard, it will be understood that the present disclosure is not limited to any specific method for determining the occurrence rate of events during the execution of the tests (at step 504).

At step 510, a stability index is generated for the source code. In some implementations, the stability index may be based on the weighted average of the occurrence rates determined at step 508. As noted above, in some implementations, the stability index may include any number that is (at least in part) proportional to at least one of the average occurrence rates that are determined at step 510. For example, in one particular implementation, the stability index may be generated in accordance with Equation 1 below:

$$\text{stability index} = 1 - \frac{\sum_0^n (weight_i)(rate_i)}{n}, \quad (1)$$

where $rate_i$ is the i-th occurrence rate that is identified at step 508, and n is the total number of different occurrence rates that are identified at step 508.

At step 512, the source code is deployed based on the stability index. In some implementations, the source code may be deployed automatically based on the stability index. For example, if the stability index is greater than or equal to a threshold, a lifecycle management tool may automatically deploy the source code to a production instance of the software application. On the other hand, if the stability index is less than the threshold, the lifecycle management tool may refrain from deploying the source code to a production instance of the software application. Additionally or alternatively, in some implementations, the source code may be deployed manually based on the stability index. For example, the stability index may be displayed within the user interface of the lifecycle management tool for viewing by developers of the software application, allowing the developers of the software application to make an informed decision, based on the stability index, of whether to deploy the source code to a production instance of the software application. An example of one such user interface is discussed further below with respect to FIGS. 7A-B. As another example, the stability index may be used as a basis for enabling (or presenting) a user interface component for deploying the source code to a production instance of the software application. If the stability index is greater than or equal to a threshold, the user interface of the lifecycle management tool may display (or otherwise enable) a button (and/or another type input user interface component), which, when activated by a user, causes the lifecycle management tool to deploy the source code to a production instance of the software application. On the other hand, if the stability index is below the threshold, the lifecycle management tool may allow the button to remain hidden, thereby denying its users the ability to deploy (at will) the source code to a production instance of the software application. An example of a user interface in which an input user interface component is enabled or disabled based on a stability index is discussed further below with respect to FIGS. 7C-D.

Figure 6:
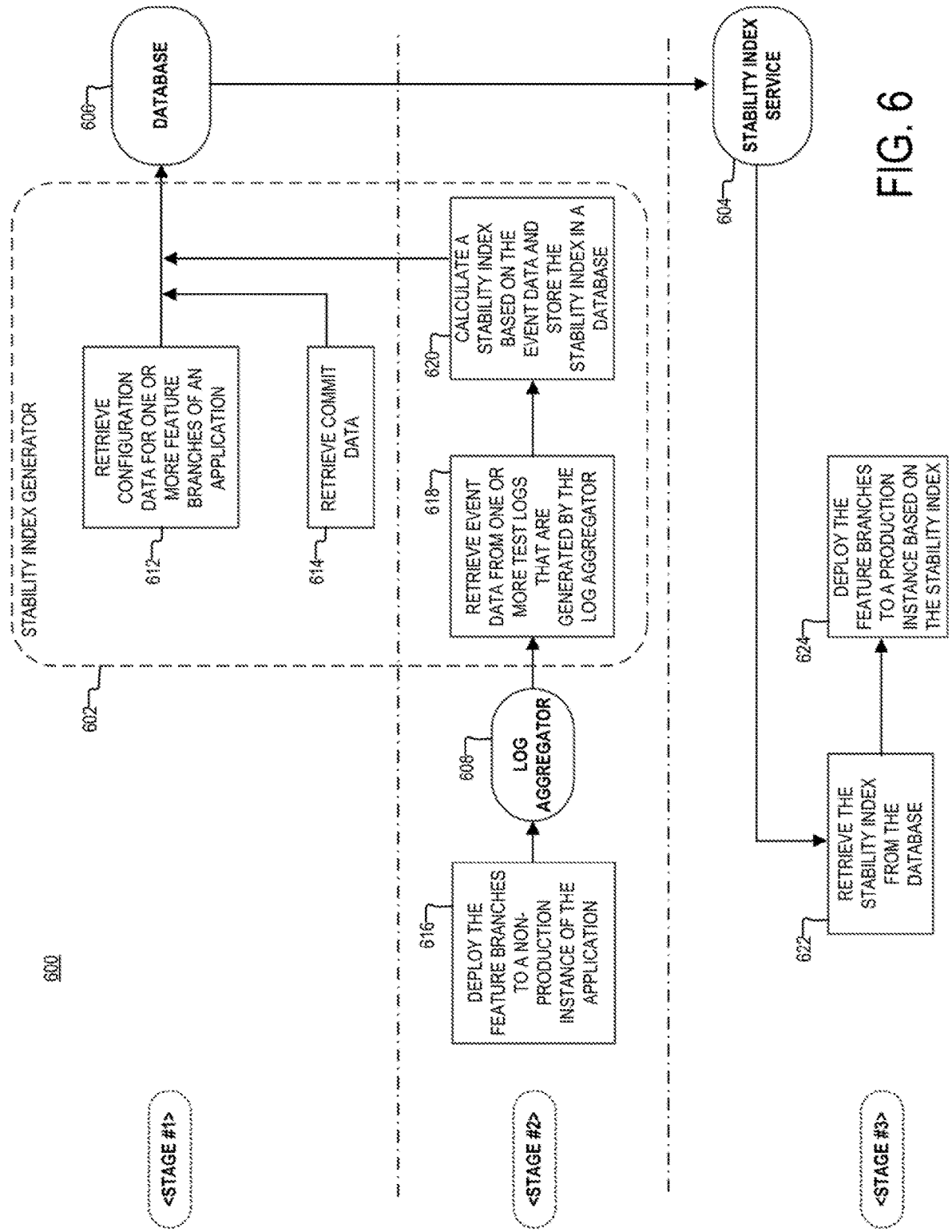
FIG. 6 is a flowchart of an example of a process for calculating a stability index for source code, according to aspects of the disclosure.

FIG. 6 is a schematic diagram illustrating a process 600 for calculating a stability index for source code by the lifecycle management tool 110. According to the example of FIG. 6, the lifecycle management tool 110 is provided with a stability index generator 602, a stability index service 604, a database 606, and a log aggregator 608. The stability index generator 602 may include logic that is configured to calculate a stability index for source code that is managed by the lifecycle management tool 110. The database 606 may include one or more data structures that are arranged to store any stability indices that are generated by the stability index generator 602, as well as data that is used for the generation of the stability indices. The stability index service 604 may include logic that is configured to retrieve, from the database 606, a stability index for any particular (branch of) source code, and provide the stability index to one or more components of the lifecycle management tool that are configured to deploy the source code to a production instance of the software application 114. In some implementations, the stability index service 604 may be implemented as an application programming interface (API), which other parts (or components) of the lifecycle management tool 110 may call to obtain stability indices for various branches of source code. The log aggregator 608 may include logic that is configured to log various types of events that are generated during the testing of the source code.

At step 612, the lifecycle management tool 110 retrieves configuration data for the feature branches 210 and stores the configuration data in the database 606. In some implementations, the configuration data may be retrieved from a .YML file and/or any other file that is used to define (and/or configure) the pipeline 112. Additionally or alternatively, in some implementations, the configuration data may include compiler data and/or any other suitable type of data that is used in compiling and/or deploying the feature branches 210 to a production or non-production instance of the software application 114.

At step 614, the lifecycle management tool 110 retrieves commit data for the feature branches 210 and stores the commit data in the database 606. In some implementations, the commit data may include the respective commit ID) for each of the feature branches 210. Storing the commit data in the database 606 effectively enables stability indices for different source code branches that are stored in the database 606 to be searchable (and/or retrievable) based on the commit IDs of the source code branches. Thus, when a production instance of the software application 114 is being built, the respective stability indices for different develop branches (and/or their constituent branches) can be retrieved based on their commit IDs, so that a decision can be made as to whether to include the develop branches (and/or feature branches) in the production instance.

At step 616, the feature branches 210 are combined to produce the develop branch 220, and the develop branch 220 is deployed to a non-production instance of the software application 114. After the develop branch 220 is deployed to the non-production instance of the software application 114, one or more tests are executed on the non-production instance. As the tests are being executed, any events that are generated by the tests are recorded into one or more test logs by the log aggregator 608. By way of example, recording any of the events into a test log may include storing in the log data associated with the event. Such data may identify a type of the event, a line of source code where the event occurred, a test that triggered the event, and/or any other characteristic of the event.

At step 618, event data is retrieved from any of the test logs by the log aggregator 608. At step 620, a stability index is generated based on the retrieved event data, in some implementations, the stability index may be generated in the manner discussed above with respect to FIGS. 4A-B. After the stability index is generated, the stability index is stored in the database 606. At step 622, the stability index is retrieved from the database 606 by the stability index service 604.

At step 624, the develop branch 220 is promoted to a master branch 230 and deployed to a production instance of the software application 114 based on the retrieved stability index. For example, if the stability index is greater than or equal to a threshold, the develop branch 220 may be promoted to the master branch 230 and deployed to production instance of the software application 114. On the other hand, if the stability index is less than the threshold, the develop branch 220 may remain in development. Additionally or alternatively, in some implementations, the develop branch 220 may be promoted and deployed manually based on the stability index. For example, the stability index may be displayed within a user interface of the lifecycle management tool 110, allowing developers to make an informed decision, based on the stability index, of whether to promote the develop branch 220 to the master branch 230 and deploy it to a production instance of the software application 114. An example of one such user interface is discussed further below with respect to FIGS. 7A-B. As another example, as discussed above with respect to FIG. 5, the stability index may be used as a basis for enabling (or presenting) a user interface component for deploying the develop branch 220.

FIG. 6 further illustrates the manner in which the process 600 is integrated into the pipeline 112 of the lifecycle management tool 110. As illustrated, steps 612 and 614 may be executed at stage #1 of the pipeline 112. Steps 616, 618, and 620 may be executed at stage #2 of the pipeline 112. And steps 622 and 624 may be executed during stage #3 of the pipeline 112. Furthermore, as illustrated in FIG. 6, the stability index generator 602 may be integrated into logic (of the lifecycle management tool 110) that is arranged to implement stage #1 and stage #2 of the pipeline 112, and the stability index service 604 may be integrated into logic (of the lifecycle management tool 110) that is arranged to implement stage #3 of the pipeline 112. Although in the present example the stability index generator 602 and the stability index service 604 are both implemented in software (e.g., as one or more processor-executable instructions), it will be understood that alternative implementations are possible in which any of the stability index generator 602 and the stability index service 604 is implemented in hardware or as a combination of hardware and software.

In some respects, the pipeline 112 may be represented by: (i) storage for storing source (and/or various source code builds) and (ii) logic for processing the source code. The logic for processing the source code may include logic for testing the source code, logic for assigning commit IDs to the source code, logic for storing the source code in the storage, and/or logic for performing any other operation that is normally performed by lifecycle management tools, such as GitLab. As can be readily appreciated, FIG. 6 provides an example of one possible way of modifying the processing logic of a software development pipeline to calculate and consider a stability index for source code stored in the pipeline 112 during the source code's development cycle.

Figure 7A:
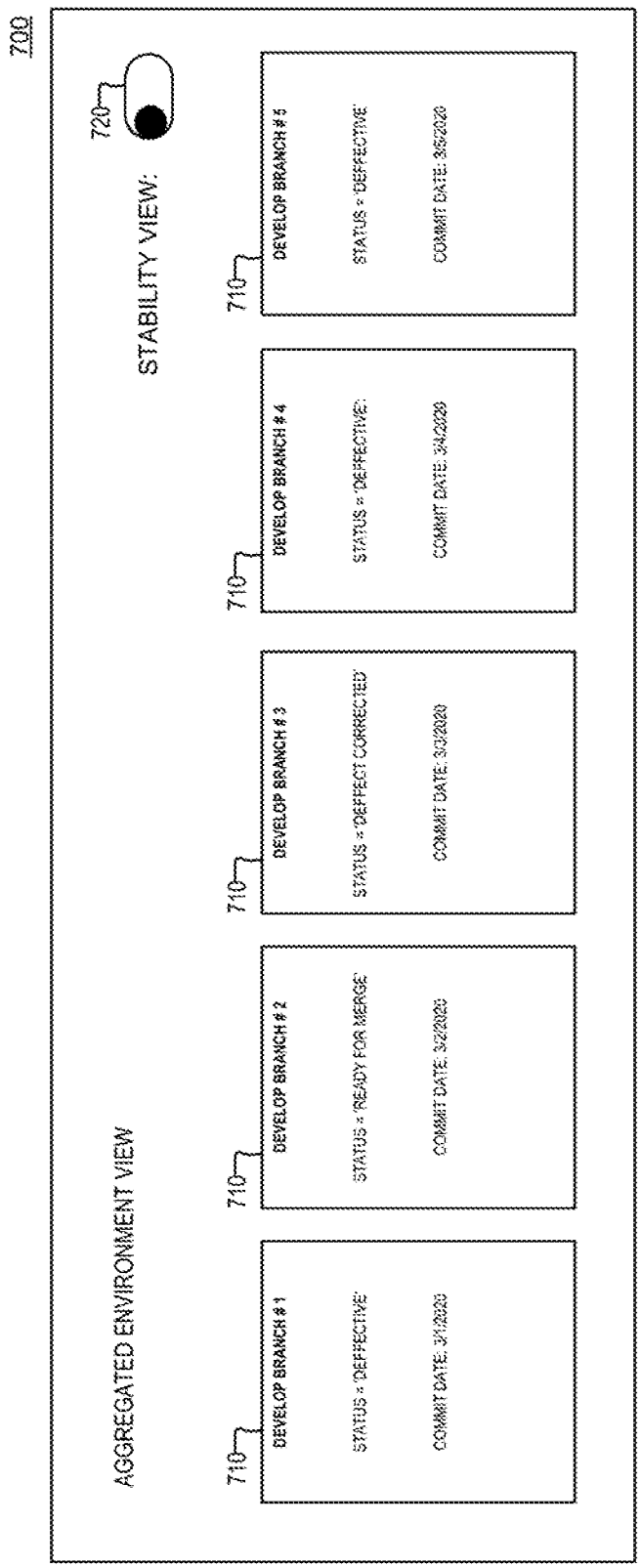
FIG. 7A is a diagram of an example of a graphical user interface, according to aspects of the disclosure.

FIG. 7A is a diagram showing a screen 700 when the screen 700 is in a first state. The screen 700 may be part of a graphical user interface of the lifecycle management tool 110. As illustrated, the screen 700 may include a plurality of user interface components 710. Each of the user interface components 710 may be associated with a different one of a plurality of develop branches of a software application (e.g., the software application 114) that are part of the pipeline 112. Furthermore, each of the user interface components 710 may be arranged to include one or more of: (i) an identifier corresponding to the component's 710 respective develop branch, (ii) an indication of the current status of the develop branch, (iii) an indication of the date when the develop branch was committed. Although not shown, each of the user interface components 710 may further include an ID of the developer who has coded the develop branch. Furthermore, the screen 700 may include a slider 720 for transitioning the screen 700 between the first state and a second state. More particularly, when the slider 720 is in a first position (e.g., left), the screen 700 may be in the first state. When the slider 720 is in the second position, (e.g., right), the screen 700 may be transitioned from the first state into the second state.

Figure 7B:
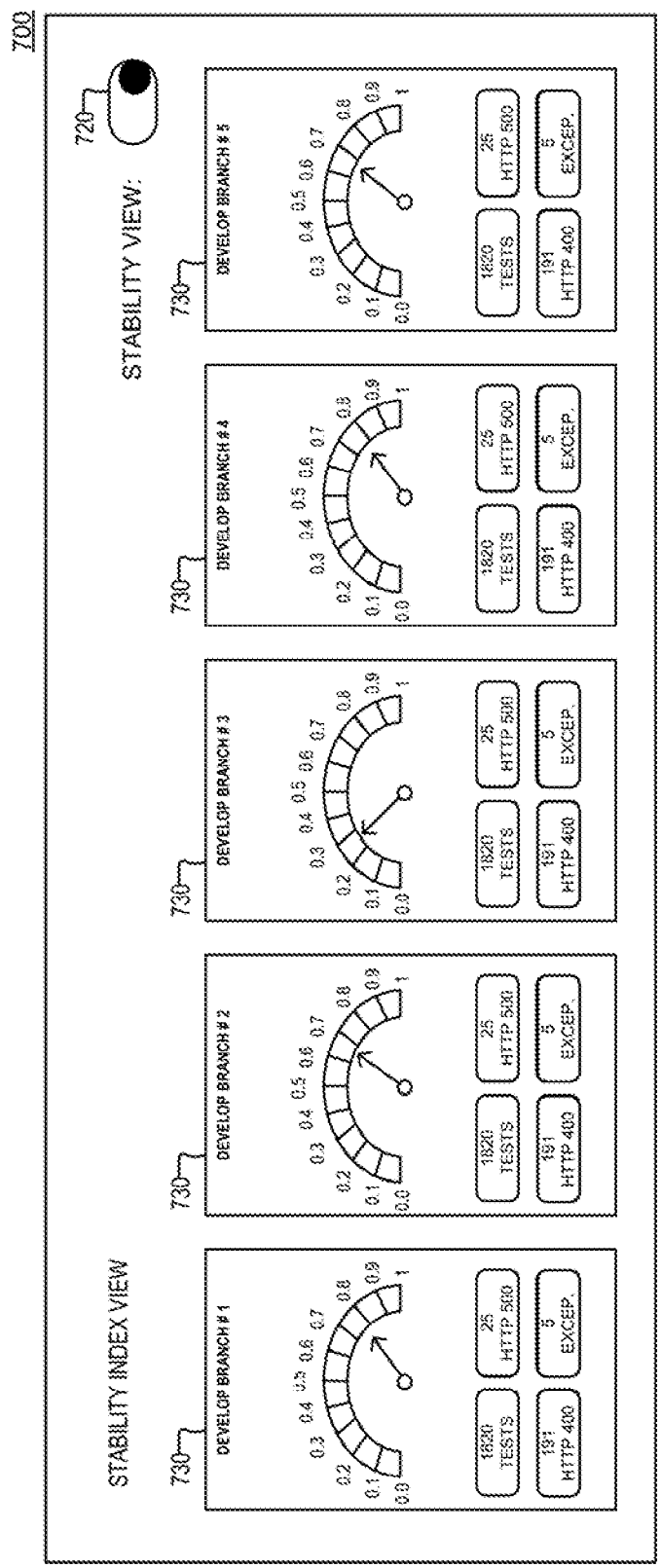
FIG. 7B is a diagram of an example of a graphical user interface, according to aspects of the disclosure.

FIG. 7B is a diagram showing the screen 700 when the screen 700 is in the second state. As illustrated, when in the second state, the screen 700 may include a plurality of user interface components 730. Each of the user interface components 730 may be associated with a different one of the plurality of develop branches of a software application (e.g., the software application 114) that are part of the pipeline 112. Furthermore, each of the user interface components 730 may be arranged to include one or more of: (i) an identifier corresponding to the component's 730 respective develop branch, (ii) an indication of the stability index for the component's 730 respective develop branch, (iii) an indication of the number of requests that have been issued to the software application over the course of a particular test, (iv) an indication of the number of HTTP 400 errors that are generated during the execution of tests. (v) an indication of the number HTTP 500 errors that are generated during the execution of tests, and (vi) an indication of the number of exceptions that are generated during the execution of the tests. FIGS. 7A-B are provided as an example only. Although in the example of FIGS. 7A-B the stability index for each develop branch is displayed by using an analog dial, it will be understood that the present disclosure is not limited to any specific for presenting stability indices. Furthermore, it will be understood that the present disclosure is not limited to any specific user interface component and/or user interface screen for presenting stability indices for source code.

Figure 7C:
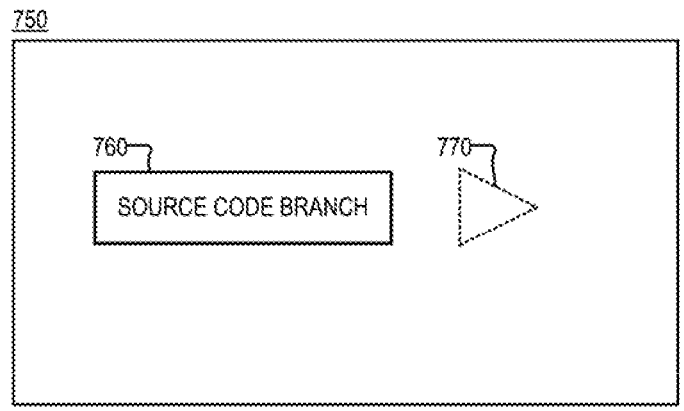
FIG. 7C is a diagram of an example of a graphical user interface, according to aspects of the disclosure.
Figure 7D:
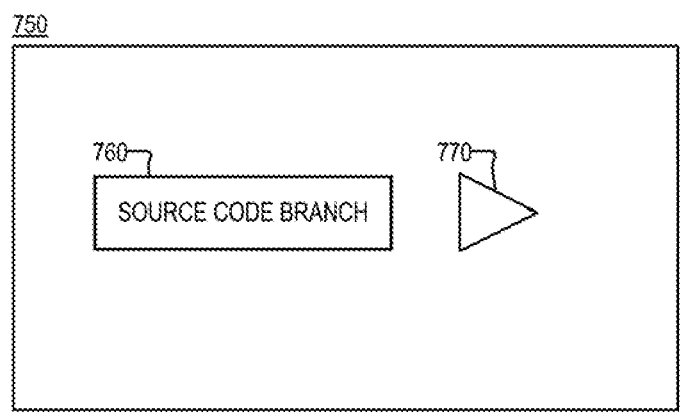
FIG. 7D is a diagram of an example of a graphical user interface, according to aspects of the disclosure.

FIGS. 7C-D show an example of a screen 750 for deploying source code to a production instance of the software application. The screen 750 may be part of a graphical user interface of the lifecycle management tool 110. As illustrated, the screen 750 may include an identifier 760 corresponding to a source code branch and a button 770. In some implementations, the source code branch may include a develop branch, such as the develop branch 220, which is discussed above with respect to FIG. 2. Additionally or alternatively, in some implementations, the source code branch may include a master branch, such as the master branch 230, which is discussed above with respect to FIG. 3. The button 770 may be used to deploy the source code branch to a production instance of the software application 114. According to the present example, the source code branch is deployed to the production instance of the software application 114 when the button 770 is activated (e.g., pressed).

FIG. 7C shows the screen 750 in a first state. The screen 750 may be transitioned (or set) to the first state, when a stability index for the source code branch is below a threshold, thus indicating that the source code branch is at high risk of malfunctioning. When the screen 750 is in the first state, the button 770 is disabled (and/or hidden), which, in turn, prevents the source code branch from being deployed to a production instance of the software application 114. FIG. 7D shows the screen 750 in a second state. The screen 750 may be transitioned (or set) to the second state, when the stability index for the source code branch is above a threshold, thus indicating that the source code branch is not at high risk of malfunctioning. When the screen 750 is in the second state, the button 770 is enabled (and/or displayed), which, in turn, allows the source code branch to be deployed to a production instance of the software application 114.

FIGS. 7C-D are provided to illustrate the broad concept of using a stability index for source code to prevent the source code from being deployed in a production instance of a software application when the stability index indicates that the source code is unstable or otherwise at high risk of malfunctioning (and/or being incompatible with other software modules). FIGS. 7C-D are provided for illustrative purposes only. Those of ordinary skill in the art will readily recognize that, in practice, the user interface of lifecycle management tools can be more complex than what is shown in FIGS. 7C-D. In this regard, it will be understood that the present disclosure is not limited to using stability indices in conjunction with any specific type of user interface screen and/or user interface component of lifecycle management tools, such as the lifecycle management tool 110.

Figure 8:
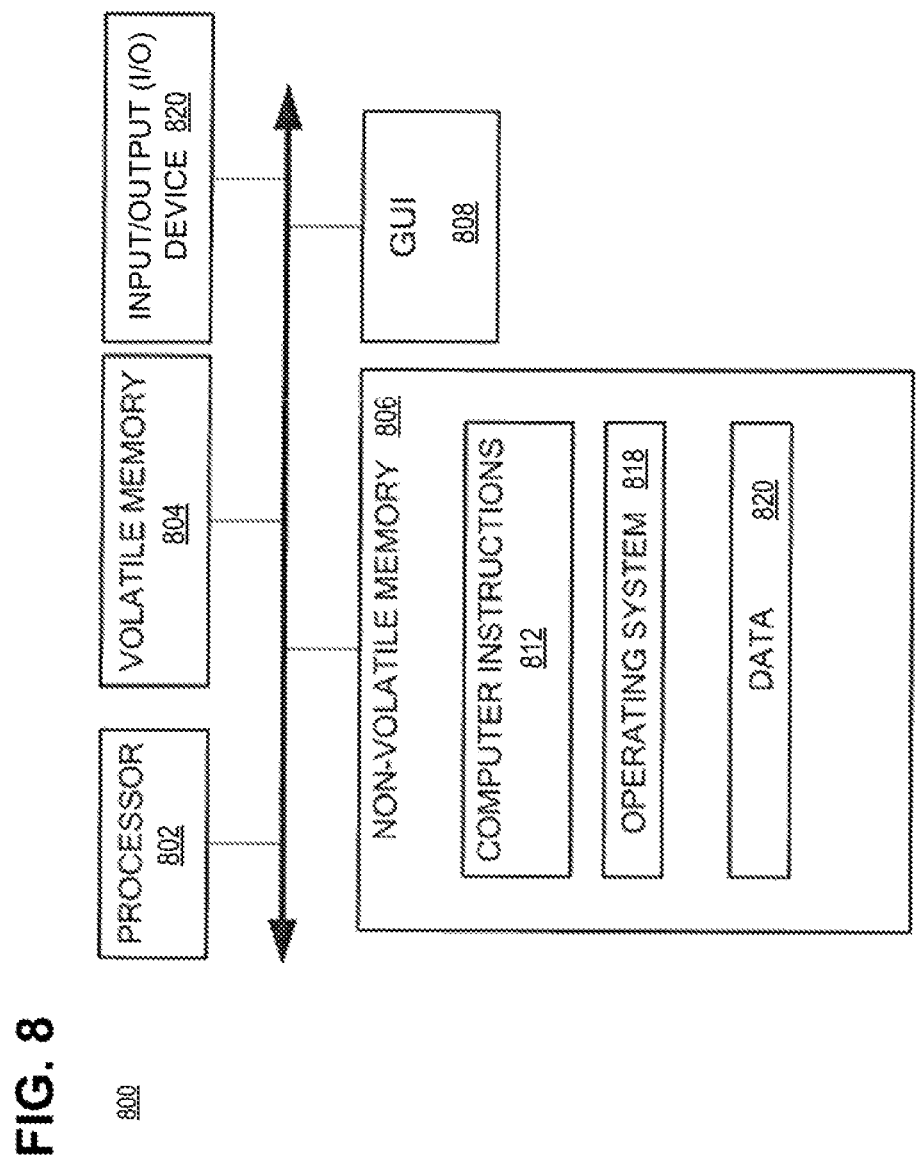
FIG. 8 is a diagram of an example of a computing device, according to aspects of the disclosure.

Referring to FIG. 8, computing device 800 that can be used to execute, at least in part, the lifecycle management tool 110. As illustrated, the computing device 800 may include processor 802, volatile memory 804 (e.g., RAM), non-volatile memory 806 (e.g., a hard disk drive, a solid-state drive such as a flash drive, a hybrid magnetic and solid-state drive, etc.), graphical user interface (GUI) 808 (e.g., a touchscreen, a display, and so forth) and input/output (I/O) device 820 (e.g., a mouse, a keyboard, etc.). Non-volatile memory 806 stores computer instructions 812, an operating system 818 and data 820 such that, for example, the computer instructions 812 are executed by the processor 802 out of volatile memory 804. Program code may be applied to data entered using an input device of GUI 808 or received from I/O device 820.

Processor 802 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard-coded into the electronic circuit or soft coded by way of instructions held in a memory device. A "processor" may perform the function, operation, or sequence of operations using digital values or using analog signals. In some embodiments, the "processor" can be embodied in an application-specific integrated circuit (ASIC). In some embodiments, the "processor" may be embodied in a microprocessor with associated program memory. In some embodiments, the "processor" may be embodied in a discrete electronic circuit. The "processor" may be analog, digital or mixed-signal. In some embodiments, the "processor" may be one or more physical processors or one or more "virtual" (e.g., remotely located or "cloud") processors.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms, do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component." "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid-state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method, comprising:
   deploying source code to a non-production instance of a software application;
   executing a plurality of tests on the non-production instance of the software application and logging any events that are generated during the tests in one or more test logs;
   retrieving data from the one or more test logs and calculating a stability index for the source code based on the data that is retrieved from the one or more test logs, the stability index being calculated based on respective occurrence rates of a plurality of event types; and
   deploying the source code to a production-instance of the software application based on the stability index of the source code,
   wherein the respective occurrence rate for any given one of the plurality of event types is based on a percentage of the plurality of tests that result in an event from the given event type.

2. The method of claim 1, wherein calculating the stability index includes:
   identifying the plurality of event types;
   identifying the respective occurrence rates for the plurality of event types based on the data that is retrieved from the test logs; and
   calculating a weighted average of the respective occurrence rates.

3. The method of claim 2, wherein the software application includes a web-based application, and the plurality of event types includes one or more of Hypertext Transfer Protocol (HTTP) 500 errors and HTTP 400.

4. The method of claim 1, wherein deploying the source code to a production instance of the software application includes outputting an indication of the stability index within a user interface of a lifecycle management tool that is used to deploy the production instance of the software application.

5. The method of claim 1, wherein deploying the source code to a production instance based on the stability index includes enabling a user interface component of a lifecycle management tool based on a value of the stability index, wherein the source code is deployed, by the lifecycle management tool, to the production instance of the software application in response to the user interface component being activated.

6. The method of claim 2, wherein the stability index is calculated in accordance with the equation of:

$$\text{stability index} = 1 - \frac{\sum_{o}^{n}(weight_i)(rate_i)}{n}$$

where $weight_i$ is a weight coefficient, $rate_i$ is any of the identified respective occurrence rates, and n is an upper bound of summation.

7. The method of claim 1, wherein the stability index for the source code is generated by a stability index generator that is integrated into a software development pipeline of a lifecycle management tool, and the source code is deployed to the production instance of the software application by the lifecycle management tool.

8. A system, comprising:
a memory; and
at least one processor operatively coupled to the memory, the at least one processor being configured to perform the operations of:
deploying source code to a non-production instance of a software application;
executing a of tests on the non-production instance of the software application and logging any events that are generated during the tests in one or more test logs;
retrieving data from the one or more test logs and calculating a stability index for the source code based on the data that is retrieved from the one or more test logs, the stability index being calculated based on respective occurrence rates of a plurality of event types; and
deploying the source code to a production-instance of the software application based on the stability index of the source code,
wherein the respective occurrence rate for any given one of the plurality of event types is based on a percentage of the plurality of tests that result in an event from the given event type.

9. The system of claim 8, wherein calculating the stability index includes:
identifying the plurality of event types;
identifying the respective occurrence rates for the plurality of event types based on the data that is retrieved from the test logs; and
calculating a weighted average of the respective occurrence rates.

10. The system of claim 9, wherein the software application includes a web-based application, and the plurality of event types includes one or more of Hypertext Transfer Protocol (HTTP) 500 errors and HTTP 400 errors.

11. The system of claim 8, wherein deploying the source code to a production instance of the software application includes outputting an indication of the stability index within a user interface of a lifecycle management tool that is used to deploy the production instance of the software application.

12. The system of claim 8, wherein deploying the source code to a production instance based on the stability index includes enabling a user interface component of a lifecycle management tool based on a value of the stability index, wherein the source code is deployed, by the lifecycle management tool, to the production instance of the software application in response to the user interface component being activated.

13. The system of claim 9, wherein the stability index is calculated in accordance with the equation of:

$$\text{stability index} = 1 - \frac{\sum_{o}^{n} (weight_i)(rate_i)}{n}$$

where $weight_i$ is a weight coefficient, $rate_i$ is any of the identified respective occurrence rates, and n is an upper bound of summation.

14. The system of claim 8, wherein the stability index for the source code is generated by a stability index generator that is integrated into a software development pipeline of a lifecycle management tool, and the source code is deployed to the production instance of the software application by the lifecycle management tool.

15. A non-transitory computer-readable medium storing one or more processor-executable instructions, which, when executed by at least one processor, cause the at least one processor to perform the operations of:
deploying source code to a non-production instance of a software application;
executing a plurality of tests on the non-production instance of the software application and logging any events that are generated during the tests in one or more test logs;
retrieving data from the one or more test logs and calculating a stability index for the source code based on the data that is retrieved from the one or more test logs, the stability index being calculated based on respective occurrence rates of a plurality of event types; and
deploying the source code to a production-instance of the software application based on the stability index of the source code,
wherein the respective occurrence rate for any given one of the plurality of event types is based on a percentage of the plurality of tests that result in an event from the given event type.

16. The non-transitory computer-readable medium of claim 15, wherein calculating the stability index includes:
identifying the plurality of event types;
identifying the respective occurrence rates for the plurality of event types based on the data that is retrieved from the test logs; and
calculating a weighted average of the respective occurrence rates.

17. The non-transitory computer-readable medium of claim 16, wherein the software application includes a web-based application, and the plurality of event types includes one or more of Hypertext Transfer Protocol (HTTP) 500 errors and HTTP 400 errors.

18. The non-transitory computer-readable medium of claim 15, wherein deploying the source code to a production instance of the software application includes outputting an indication of the stability index within a user interface of a lifecycle management tool that is used to deploy the production instance of the software application.

19. The non-transitory computer-readable medium of claim 15, wherein deploying the source code to a production instance based on the stability index includes enabling a user interface component of a lifecycle management tool based on a value of the stability index, wherein the source code is deployed by the lifecycle management tool to the production instance of the software application in response to the user interface component being activated.

20. The non-transitory computer-readable medium of claim 16, wherein the stability index is calculated in accordance with the equation of:

$$\text{stability index} = 1 - \frac{\sum_{o}^{n} (weight_i)(rate_i)}{n}$$

where $weight_i$ is a weight coefficient, $rate_i$ is any of the identified respective occurrence rates, and n is an upper bound of summation.

\* \* \* \* \*